UNITED STATES PATENT OFFICE.

FRIEDRICH RUNKEL, OF ELBERFELD, GERMANY, ASSIGNOR TO FARBENFABRIKEN OF ELBERFELD CO., OF NEW YORK, N. Y.

BASIC DYE AND PROCESS OF MAKING SAME.

SPECIFICATION forming part of Letters Patent No. 677,279, dated June 25, 1901.

Application filed February 6, 1901. Serial No. 46,200. (No specimens.)

*To all whom it may concern:*

Be it known that I, FRIEDRICH RUNKEL, doctor of philosophy, chemist, (assignor to the FARBENFABRIKEN OF ELBERFELD CO., of New York,) residing at Elberfeld, Germany, have invented a new and useful Improvement in Reddish-Violet Basic Dyes; and I hereby declare the following to be a clear and exact description of my invention.

My invention relates to the production of new reddish-violet dyestuffs by condensing in the presence of mineral acids the auramins, having, for instance, the following general formula:

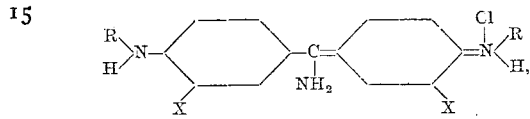

(in which formula R means an alkyl radical—such as methyl, ethyl, or the like—X, a hydrogen atom, which can be substituted by a methylic group) with alpha-methylindole, (methylketole,) described by E. Fischer, (see "*Annalen der Chemie*," Vol. 236, p. 126,) and having the following formula:

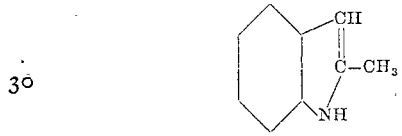

In this process the group —NH$_2$ of the auramin is replaced by the radical of alpha-methylindole, the ammonium salt of the respective mineral acid being formed as by-product and the salts of the bases of the new coloring-matters are thus produced directly. The said new dyestuffs are, in the shape of the mineral-acid salts, dark-brown powders, which are readily soluble in water with a reddish-violet color, which is not essentially changed by the addition of dilute mineral acids. They are also readily soluble in alcohol with a reddish-violet color and are dissolved by concentrated sulfuric acid of 66° Baumé with a yellowish-brown color. They dye cotton mordanted with tannin, wool, and silk reddish-violet shades fast to the action of dilute mineral acids.

In carrying out my new process practically I can proceed as follows, the parts being by weight: A solution prepared from fifteen parts of pure auramin G, having the formula:

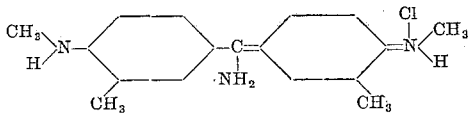

and 6.5 parts of alpha-methylindole in sixty-five parts of a thirty-per-cent. hydrochloric acid is heated for about from one to two hours on a water-bath. The yellow color of the solution slowly turns brown. Subsequently it is stirred into about seven hundred parts of ice-water, which is mixed with about one hundred parts of a watery solution of common salt. By means of this operation the new dyestuff is separated in the shape of dark flakes. It is filtered off, pressed, and dried at about from 80° to 90° centigrade.

When dry and pulverized, the new dyestuff thus obtained is a dark-brown powder, readily soluble in water and in alcohol with a reddish-violet color. By the addition of caustic alkalies, alkaline carbonates, or ammonia to its watery solution the free base of the dyestuff is precipitated in the shape of orange-yellow flakes. In concentrated sulfuric acid (of 66° Baumé) it is dissolved with a yellowish-brown color, which is not changed by the addition of a small quantity of ice, while a reddish-violet solution is obtained on adding a larger quantity of ice.

The new coloring-matter dyes cotton mordanted with tannin, wool, and silk clear reddish-violet shades fast to the action of dilute mineral acids. The same dyestuffs can also be obtained by condensing the thio-ketones of the general formula:

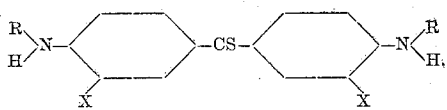

(R meaning in this formula an alkyl radical—such as methyl, ethyl, or the like—X meaning a hydrogen atom which can be substituted by a methylic group) or the respective ketones with alpha-methylindole in the presence of mineral acids. On performing this reaction sulfureted hydrogen (respectively water) is set free.

Having now described my invention and in what manner the same is to be performed, what I claim as new, and desire to secure by Letters Patent, is—

1. The process for producing new basic dyestuffs, which process consists in first treating the auramins having the following general formula:

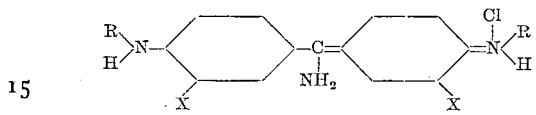

R meaning an alkyl radical and X meaning a hydrogen atom which can be substituted by a methylic group with alpha-methylindole in the presence of mineral acids, and then isolating the resulting dyestuffs from the reaction mixture, substantially as hereinbefore described.

2. The process for producing a new basic dyestuff, which process consists in first treating the dyestuff having the following formula:

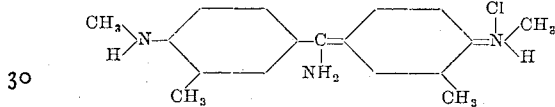

with alpha-methylindole in the presence of mineral acids and then isolating the resulting dyestuff from the reaction mixture, substantially as hereinbefore described.

3. The herein-described new basic dyestuffs being, when dry and pulverized, dark-brown powders readily soluble in water with a reddish-violet color which is not essentially changed by the addition of dilute mineral acids, also readily soluble in alcohol with a reddish-violet color, being dissolved by concentrated sulfuric acid (of 66° Baumé) with a yellowish-brown color; dyeing cotton mordanted with tannin, wool and silk reddish-violet shades fast to the action of dilute mineral acids, substantially as hereinbefore described.

4. The herein-described new basic dyestuff, obtainable by condensing the dyestuff having the following formula:

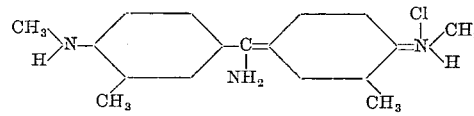

with alpha-methylindole in the presence of mineral acids, being, when dry and pulverized, a dark-brown powder readily soluble in water and in alcohol with a reddish-violet color, the free base of the dyestuff being separated in the shape of orange-yellow flakes by the addition of caustic alkalies, alkaline carbonates or ammonia to its watery solution; being dissolved by concentrated sulfuric acid of 66° Baumé with a yellowish-brown color which is not changed by the addition of a small quantity of ice, while a reddish-violet solution is obtained on adding a larger quantity of ice to the sulfuric-acid solution, dyeing cotton mordanted with tannin, wool and silk clear reddish-violet shades fast to the action of dilute mineral acids, substantially as hereinbefore described.

In testimony whereof I have signed my name in the presence of two subscribing witnesses.

FRIEDRICH RUNKEL.

Witnesses:
OTTO KÖNIG,
J. ACHADDEJI.